(12) United States Patent
Wanek et al.

(10) Patent No.: US 7,232,101 B2
(45) Date of Patent: Jun. 19, 2007

(54) HARD DRIVE TEST FIXTURE

(75) Inventors: Donald Wanek, Rochester, MN (US);
Richard Sands, Rochester, MN (US);
Robert Walter, Rochester, MN (US);
Mark Troutman, Rochester, MN (US)

(73) Assignee: Pemstar, Inc., Rochester, MN (US)

( * ) Notice: Subject to any disclaimer, the term of this patent is extended or adjusted under 35 U.S.C. 154(b) by 157 days.

(21) Appl. No.: 10/723,595

(22) Filed: Nov. 26, 2003

(65) Prior Publication Data
US 2005/0109131 A1 May 26, 2005

(51) Int. Cl.
*G01M 19/00* (2006.01)
*F16M 11/00* (2006.01)
*G01N 17/00* (2006.01)
*G11B 33/02* (2006.01)
*G11B 33/06* (2006.01)

(52) U.S. Cl. ............................. 248/346.06; 73/865.9; 248/310

(58) Field of Classification Search ........... 248/346.06, 248/309.1, 310, 316.8, 912–913; 324/212, 324/555, 760; 356/244; 269/55, 903; 73/865.6, 73/865.9; 369/53.1, 53.41
See application file for complete search history.

(56) References Cited

U.S. PATENT DOCUMENTS

| | | | |
|---|---|---|---|
| 1,011,990 A * | 12/1911 | Molmark .................. 269/55 X |
| 1,291,610 A * | 1/1919 | Nicoson .................... 269/55 X |
| 2,614,413 A | 10/1952 | Alley, Jr. |
| 2,664,544 A * | 12/1953 | Caplis ........................ 324/414 |
| 3,184,275 A | 5/1965 | Gardner |
| 3,302,615 A | 2/1967 | Tietje |
| 3,564,408 A * | 2/1971 | Schulz et al. ................ 324/754 |
| 3,656,058 A * | 4/1972 | Leathers ..................... 324/760 |
| 4,000,460 A | 12/1976 | Koakia et al. |
| 4,178,545 A | 12/1979 | Kneifel |
| 4,313,679 A | 2/1982 | Wolff et al. |
| 4,521,333 A | 6/1985 | Graham et al. |
| 4,812,750 A | 3/1989 | Keel et al. |
| 4,854,726 A | 8/1989 | Lesley et al. |
| 4,926,118 A | 5/1990 | O'Connor et al. |
| 5,003,254 A * | 3/1991 | Hunt et al. ............. 269/903 X |
| 5,021,732 A | 6/1991 | Fuoco et al. |
| 5,039,228 A | 8/1991 | Chalmers |
| 5,072,177 A | 12/1991 | Liken et al. |
| 5,126,656 A | 6/1992 | Jones |
| 5,143,450 A | 9/1992 | Smith et al. |
| 5,147,136 A | 9/1992 | Hartley et al. |
| 5,195,384 A | 3/1993 | Duesler, Jr. et al. |
| 5,206,518 A | 4/1993 | Fedor et al. |
| 5,364,472 A * | 11/1994 | Heyns et al. ................... 134/7 |
| 5,383,994 A | 1/1995 | Shea |
| 5,392,631 A | 2/1995 | Elwell |
| 5,431,599 A | 7/1995 | Genco |

(Continued)

FOREIGN PATENT DOCUMENTS

EP 0 617 293 A2 9/1994

(Continued)

*Primary Examiner*—Thomas P. Noland
(74) *Attorney, Agent, or Firm*—Kagen Binder, PLLC

(57) ABSTRACT

The present invention is a method and apparatus for testing electrical or optical devices. The invention includes a test fixture having a base component, a first rail and a second rail coupled to the base component, a top component coupled to the first and second rails, and an interposer coupled to the first and second rails.

20 Claims, 9 Drawing Sheets

U.S. PATENT DOCUMENTS

| | | | |
|---|---|---|---|
| 5,446,394 | A | 8/1995 | Cassidy |
| 5,450,018 | A | 9/1995 | Rieser et al. |
| 5,485,759 | A * | 1/1996 | Goff et al. ............... 73/865.9 |
| 5,503,032 | A | 4/1996 | Tikhtman et al. |
| 5,528,161 | A | 6/1996 | Linken et al. |
| 5,537,828 | A | 7/1996 | Borcuch et al. |
| 5,537,868 | A | 7/1996 | Shofner et al. |
| 5,543,727 | A | 8/1996 | Bushard et al. |
| 5,641,917 | A * | 6/1997 | Hurite et al. .......... 73/865.6 X |
| 5,660,103 | A | 8/1997 | Koopman |
| 5,675,098 | A | 10/1997 | Hobbs |
| 5,721,669 | A | 2/1998 | Becker et al. |
| 5,739,411 | A * | 4/1998 | Lee et al. .................. 73/12.13 |
| 5,767,424 | A | 6/1998 | Breunsbach et al. |
| 5,792,427 | A | 8/1998 | Hugh et al. |
| 5,834,946 | A | 11/1998 | Albrow et al. |
| 5,842,313 | A | 12/1998 | Murray et al. |
| 5,859,409 | A | 1/1999 | Kim et al. |
| 5,927,504 | A | 7/1999 | Han et al. |
| 5,986,753 | A * | 11/1999 | Seelig et al. ................. 356/244 |
| 6,009,748 | A | 1/2000 | Hildebrandt et al. |
| 6,070,478 | A | 6/2000 | Krajec et al. |
| 6,124,707 | A | 9/2000 | Kim et al. |
| 6,141,780 | A | 10/2000 | Lee |
| 6,169,413 | B1 | 1/2001 | Paek et al. |
| 6,227,701 | B1 | 5/2001 | Wu |
| 6,272,767 | B1 | 8/2001 | Botruff et al. |
| 6,526,841 | B1 | 3/2003 | Wanek et al. |
| 6,679,128 | B2 | 1/2004 | Wanek et al. |
| 6,806,700 | B2 | 10/2004 | Wanek et al. |
| 2001/0035058 | A1 | 11/2001 | Wanek et al. |
| 2002/0174732 | A1 | 11/2002 | Wanek et al. |
| 2003/0121337 | A1 | 7/2003 | Wanek et al. |
| 2003/0150284 | A9 | 8/2003 | Wanek et al. |
| 2003/0175098 | A1 * | 9/2003 | Koh et al. .............. 414/222.06 |
| 2005/0225338 | A1 * | 10/2005 | Sands et al. ................. 324/754 |

FOREIGN PATENT DOCUMENTS

| | | |
|---|---|---|
| EP | 0 834 879 A1 | 4/1998 |
| GB | 2332633 B * | 9/2001 |
| JP | 57-98583 | 6/1982 |
| JP | 57-151842 | 9/1982 |
| JP | 5-172733 | 7/1993 |
| JP | 7-140062 | 6/1995 |
| SU | 1251043 | 8/1986 |
| SU | 1578596 | 7/1990 |
| WO | WO 97/06532 | 2/1997 |
| WO | WO 01/09627 A2 * | 2/2001 |
| WO | WO 01/09627 A3 | 2/2001 |
| WO | WO 02/087211 A2 * | 10/2002 |
| WO | WO 02/087211 A3 | 10/2002 |

* cited by examiner

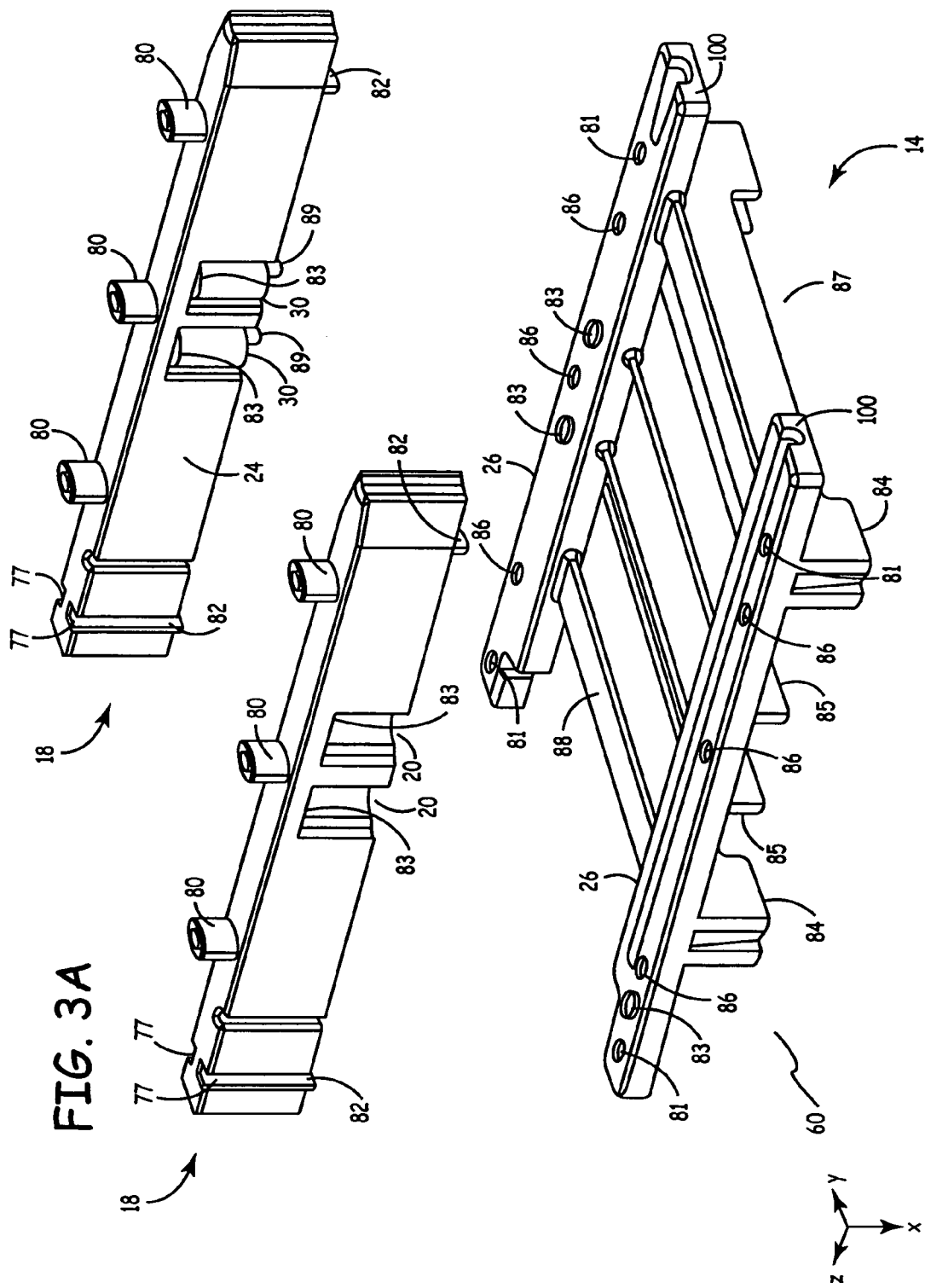

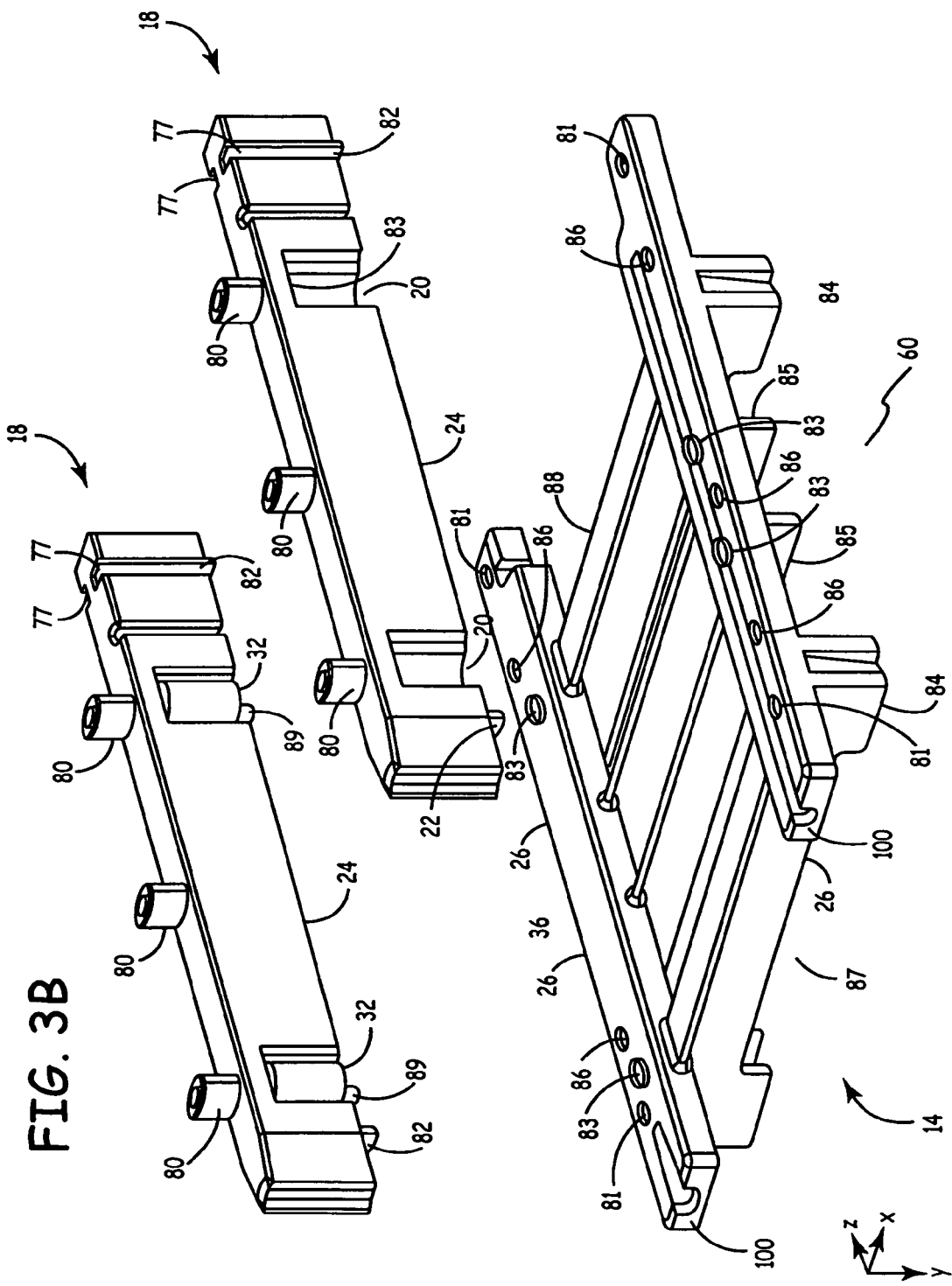

HARD DRIVE TEST FIXTURE

CROSS-REFERENCE TO RELATED APPLICATION(S)

None.

FIELD OF THE INVENTION

The present invention relates generally to a fixture or carrier for securing and testing an electrical or optical device. In a specific example, the present invention relates to a fixture for securing and testing a hard drive.

BACKGROUND OF THE INVENTION

Computer hard drives are generally subjected to a "burn-in" testing procedure. Further, the drives are also usually subjected to thermal testing or environmental conditioning testing during the design and prototyping phases of the manufacturing process. A drive is typically held in a fixture or a carrier while it undergoes the burn-in or final verification testing procedures. Further, the fixture or carrier holding the drive may be placed in an environmentally-controlled test chamber for the testing procedures. These chambers are designed to expose the device under test to controlled temperature and humidity levels so that the drive manufacturer can obtain accurate performance test results over expected environmental ranges in which the devices are designed to operate. The tests can provide a valuable tool to verify product quality and reliability and to assure that the hard drives meet industry standards.

One problem with conventional fixtures or carriers is that they are prone to transferring mechanical vibrations to the drive under test. These vibrations add "noise" to the test results.

Another problem with existing carriers is that the carriers are typically configured to operate in a horizontal position or a vertical position, but not both. That is, some existing carriers function to correctly position a drive while the carrier and drive are in a horizontal position, and other existing carriers function to correctly position a drive while the carrier and drive are in a vertical position, but most are not configured to successfully position a drive while the carrier and drive are in either a horizontal or a vertical position.

A further problem with existing carriers is the ejection mechanism, which operates to eject the device under test from the carrier after testing has concluded. Such components are typically highly complex mechanisms with several parts that are expensive, bulky, and difficult to assemble.

Thus, there is a need in the art for a hard drive fixture that reduces vibration. In addition, there is a need for a fixture that allows for operation in either a vertical or a horizontal position. There is a further need in the art for a simple, inexpensive ejection mechanism that fits into a small space.

BRIEF SUMMARY OF THE INVENTION

The present invention, in one embodiment, is a test fixture. The test fixture has a base component, a first rail and a second rail coupled to the base component, a top component coupled to the first and second rails, and an interposer coupled to the first and second rails.

The present invention, in another embodiment, is a method of testing a device. The method includes inserting the device into a fixture, performing at least one test on the device, and removing the device from the test fixture. The fixture has a base component, a first rail and a second rail coupled to the base component, a top component coupled to the first and second rails, and an interposer coupled to the first and second rails.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 3A is a perspective view of a base component and rails of a test fixture, according to one embodiment of the present invention.

FIG. 3B is an opposing perspective view of a base component and rails of a test fixture, according to one embodiment of the present invention.

DETAILED DESCRIPTION

The present invention relates to a test fixture with unique vibration damping characteristics. That is, the test fixtures disclosed herein can attain vibration damping that has never before been achieved by existing test fixtures.

Figure 7:
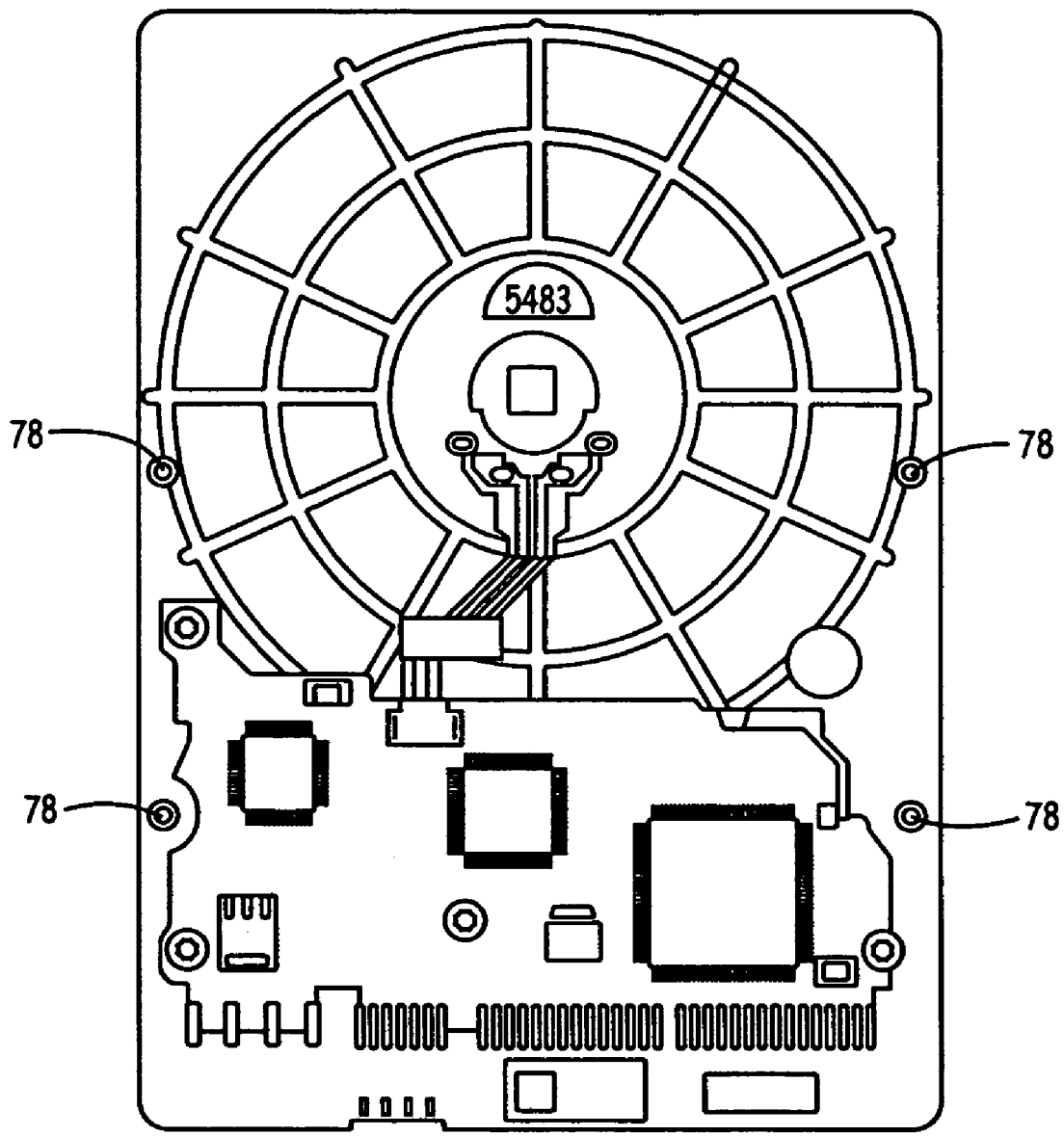
FIG. 7 is a bottom view of a hard disk drive to be tested in a test fixture.

In fact, the test fixture of the present invention, according to certain embodiments, can achieve vibration transmission identical to the transmission achieved by the "Golden Fixture," which is well known in the art as the standard for resistance to transmittal of outside vibrations in the hard drive industry. All fixture resistances to transmittal of outside vibrations are measured relative to the Golden Fixture. The Golden Fixture is a testing environment that isolates a hard drive from all outside mechanical influences and typically consists of a large base of at least 20 pounds of a very dense material such as granite. The base has four standoffs or bolts mounted on the top surface. In use, the drive to be tested is physically mounted onto the base by threading the bolts into the drive base mounting holes 78, as shown in FIG. 7.

It is well known that the vibration resistance achieved by the "Golden Fixture" is significantly better than the resistance achieved by any fixture in the existing technology. Yet, the fixture of the present invention as described herein provides such an improvement over existing test fixtures that it can match the damping characteristics of the Golden Fixture.

Figure 1:
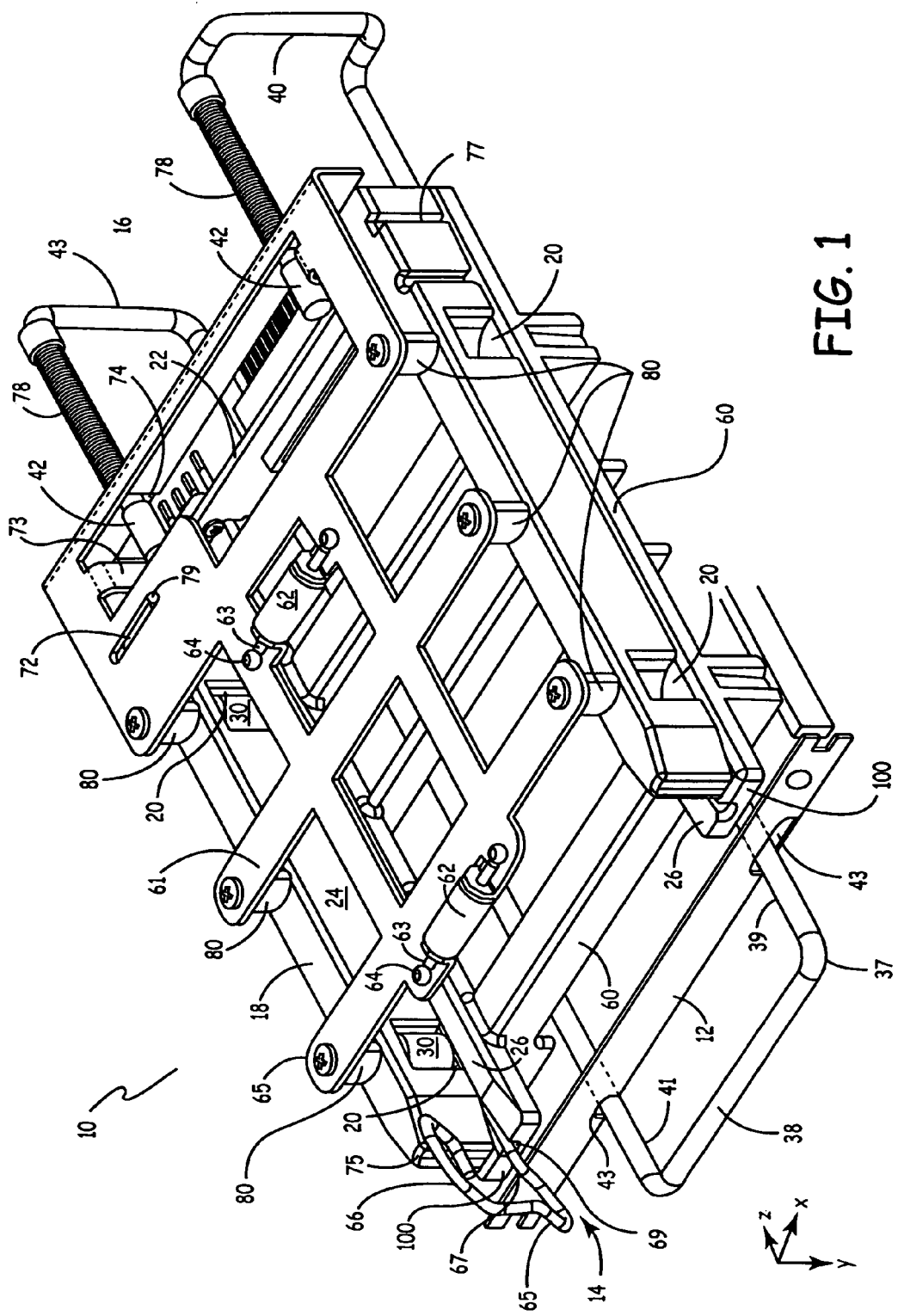
FIG. 1 is a perspective view of a test fixture, according to one embodiment of the present invention.
Figure 2:
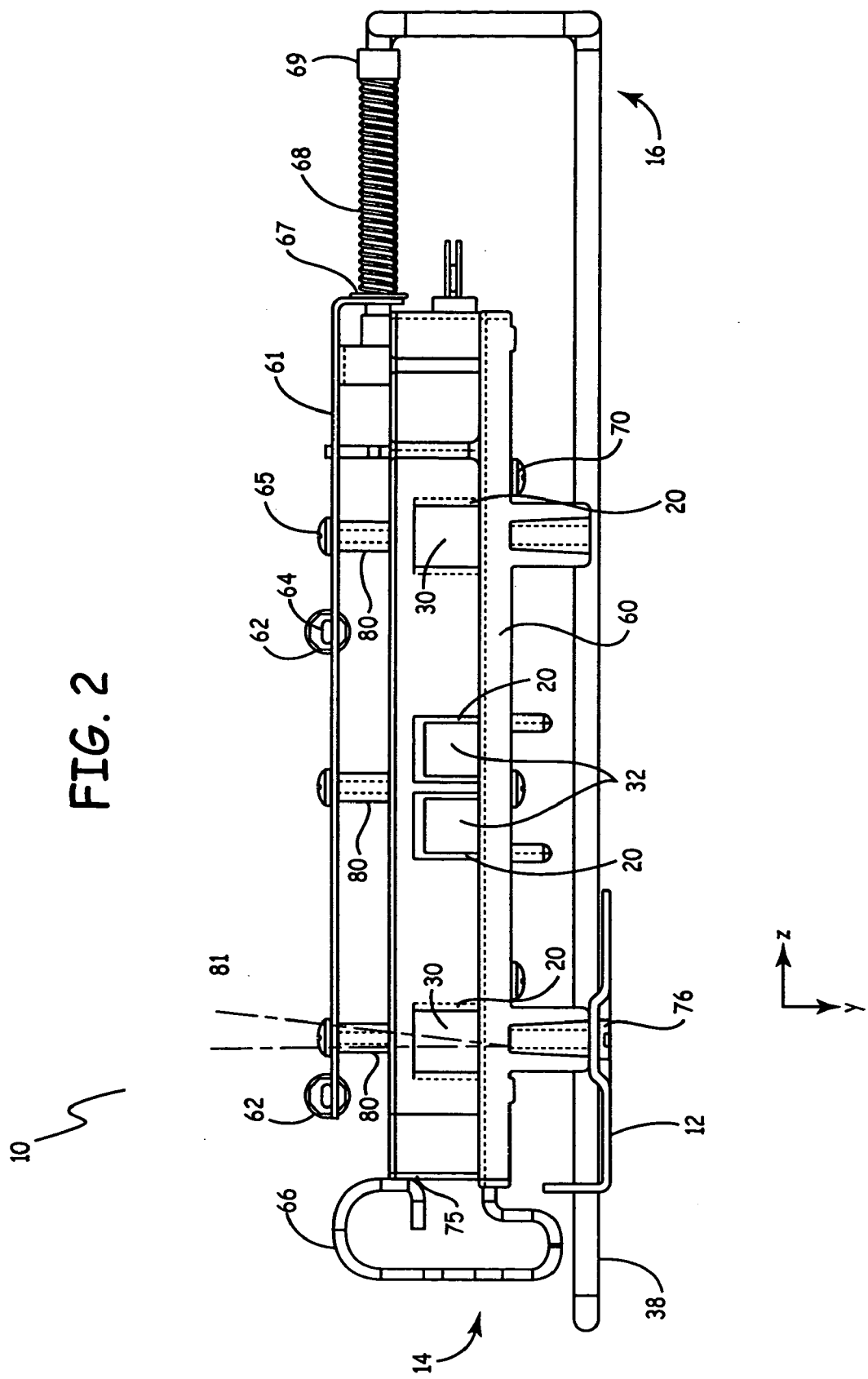
FIG. 2 is a side view of a test fixture, according to one embodiment of the present invention.
Figure 3:
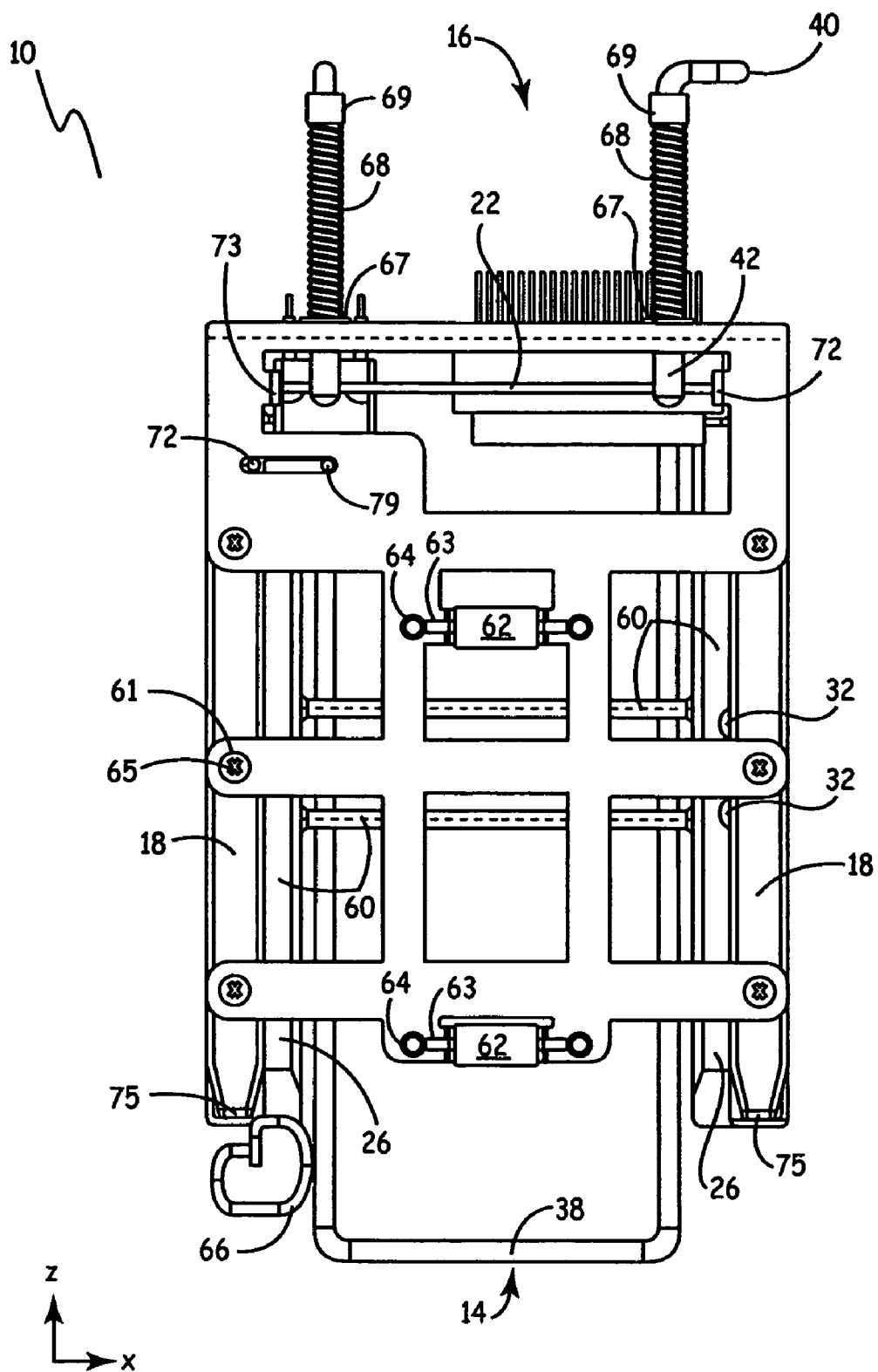
FIG. 3 is a top view of a test fixture, according to one embodiment of the present invention.

FIG. 1 shows a perspective view of a test fixture 10, according to one embodiment of the present invention. FIG. 2 depicts a side view of a test fixture 10, according to one embodiment of the invention. Further, FIG. 3 shows a top view of a test fixture 10, in accordance with one aspect of the present invention. The fixture 10 is configured to support a hard drive during testing and is further configured to interface thereto. Alternatively, the fixture 10 is configured to support other known electrical or optical devices for testing. According to one aspect of the present invention, the fixture 10 is configured for use within an environmental test chamber. Alternatively, the test fixture 10 is configured for use with any known stand, rack, storage cabinet or at any other known location for use of a test fixture.

As shown in FIGS. 1, 2, and 3, the fixture 10, according to one embodiment, includes a base 60 that supports at least two rails 18. The base 60 has two rail receiving plates 100. The rails 18 are positioned so that a testing area is defined between the rails 18. Each rail 18, includes a slot 77 for positioning and supporting an interposer 22 and recesses 20 for rollers, including positioning rollers 30. The position of the rails 18 on the rail receiving plates 100 creates a sidewall 24 and a mounting surface 26. A top plate 61 is positioned above the rails 18 on spacers 80 and is connected to the spacers 80 and rails 18 by a plurality of screws 65. The top plate 61 includes tabs 73, a slot 72, and rollers 62 disposed on shafts 63 connected to the top plate 61 by rivets 64.

Further, the fixture 10 has an ejection mechanism 37 that, when actuated, is configured to disconnect the tested device from the interposer 22 and facilitate removal of the device. The ejection mechanism 37 has a handle 38 connected to two rods 39, 41, each having back portions 40, 43 that include rubber bumpers 42 and return springs 78. In addition, the fixture 10 has a stop device 65 for appropriately positioning of a device under test. The device 65, has a handle 66 connected to a rod 67 in a groove 69 in rail receiving plate 100 under the left rail 18 and is connected to a stop portion 79 partially disposed within the slot 72 in the top plate 61. As will be explained herein, the handle can be positioned in groove 75 in left rail 18.

The interposer 22 is a component that provides a two-way connection between a connector on the device under test and the testing equipment that control the test protocols during testing, which may include such equipment as a test driver, data collection equipment, circuitry, and a power source. According to one embodiment, the interposer 22 is a test card 22. Alternatively, the interposer 22 is positioned at a rear portion 16 of the fixture 10 by any known means.

A device to be tested can be inserted through the opening at the front portion 14 of the fixture 10 and into the testing area between the left rail 18 and the right rail 18 and between the base 60 and the top plate 61. According to one embodiment where the device is a hard disk drive, the fixture 10 is configured to allow for both rear connection (the drive is positioned during insertion such that it can interface with the interposer 22 near the rear portion 16 of the fixture 10 for testing purposes) and front connection (the drive is positioned during insertion such that the test connections must occur at the front portion 14 of the fixture 10). Alternatively, the fixture 10 can be configured to allow for only rear connection or for only front connection. In a further alternative, the fixture 10 of the present invention is used to test other devices. In accordance with one aspect of the invention, the fixture 10 of the present invention containing a device to be tested is functional in either a horizontal or a vertical position.

In accordance with one embodiment, the base 60 is mounted to a pan 12. The pan 12 is also referred to as a pallet or shelf, and is generally a flat surface to which the base 60 can be mounted. As best seen in FIG. 2, the base 60 is mounted to the pan 12 by a plurality of bolts 76, thereby providing significant stiffening to the pan 12. Alternatively, the base 60 is connected to the pan 12 by any known fastening means.

As depicted in FIGS. 3A and 3B, the base 60, according to one aspect of the present invention, is configured to allow for uniform airflow around the device mounted in the fixture 10. The uniform airflow provided by the base 60 assures uniform temperature and humidity during testing of a device mounted in the fixture 10 in an environmental chamber. The base 60, in accordance with one embodiment, has two main braces 84 and two secondary braces 85 connected at each end to rail receiving plates 100. Alternatively, the base 60 has three or more main braces 84 and one or more secondary braces 85.

The main braces 84 are rigid and are configured to mount firmly to the pallet 12. In accordance with one aspect of the present invention, each main brace 84 has an arch 87 on its underside that permits airflow between the pallet 12 and the base 60 along the length of the base 60 underneath the device mounted in the fixture 10, even when the braces 85 are firmly attached to the pallet 12. Alternatively, each of the main braces 84 has any kind of aperture(s) to provide airflow underneath the fixture 10 while maintaining the necessary rigidity. Further, the main braces 84 according to one embodiment connect to the rail receiving plates 100 such that there is a space between the top of the rail receiving plates 100 and the top 88 of the main braces 84. This space allows for airflow under the device mounted in the fixture 10.

The secondary braces 85 provide significant additional rigidity to the base 60 compared with the primary braces alone. Further, the secondary braces 85 also allow for airflow. The secondary braces 85 according to one embodiment of the invention have a smaller width and height than the main braces 84 and thus extend a smaller distance from the rail receiving plates 100. As a result of the smaller width, airflow occurs between the pallet 12 and the base 60 along the length of the base 60. Further, the secondary braces 85 connect to the rail receiving plates 100 such that there is a space between the top of the rail receiving plates 100 and the top 88 of the secondary braces 85. That space provides a path of free airflow between the bottom of the drive under test and the top surfaces 88 of the braces 84, 85. In addition, the secondary braces 85 according to one embodiment have aerodynamically-shaped ends that are conducive to increased airflow. Alternatively, the base 60 is configured in any structural configuration known to allow for uniform airflow.

The base 60 according to one aspect of the invention is an injection-molded composite that is electrically dissipative, lubricated, and vibration-damping. For example, the base 60 according to one embodiment is made of a composite of RTP 387 TFE 10, which is sold by RTP Company in Winona, Minn. Alternatively, the base 60 is made of any known electrically dissipative, lubricated, and vibration-damping material.

The rails 18, according to one embodiment of the present invention, are depicted in FIGS. 3A and 3B. According to one embodiment, each rail 18 is made of an electrically dissipative, lubricated, and vibration-damping composite. In one embodiment, the rails 18 connect to the rail receiving plates 100 such that, when the two are connected, they define a sidewall 24 and a mounting surface 26 which support and guide a hard disk drive as it is inserted within the fixture 10, as best shown in FIG. 1. The sidewall 24 and mounting surface 26, in accordance with one aspect of the invention, are both angled at the opening at the front portion 14 of the fixture 10 to allow easier insertion of a drive into the opening.

According to one embodiment, the rails 18 are attached to the rail receiving plates 100 of the base 60 by a plurality of alignment sockets 81 in the rail receiving plates 100 and corresponding pins 82 on the rails 18, as shown in FIGS. 3A and 3B. The sockets 81 and pins 82 facilitate assembly of the base 60 and rails 18 and further assist in controlling alignment of the rails 18. During fabrication, the lower roller axles 89 on the rails 18 are inserted into lower bearing pads 83 in the rail receiving plates 100. According to one embodiment, the rails 18 are further secured to the rail receiving plates 100 by screws inserted through holes 86 in the rail receiving plates 100 and into holes (not shown) in the rails 18. Alternatively, the rails 18 are attached to the base 60 by any known attachment means.

Each rail 18, according to one embodiment of the present invention, has positioning rollers 30 and pressure rollers 32 mounted in recesses 20 molded into each rail 18. The rollers 30, 32 cooperate with the rails 18 to guide and position a device to be tested. According to one embodiment, the positioning rollers 30 function to align the device to be tested such that connection points on the device are aligned with the appropriate corresponding connection points on the interposer 22. Further, the pressure rollers 32 provide pressure to urge the device against the positioning rollers 30. The rigid positioning of the device, along with the limited float allowed the interposer 22 in its locater slits 77, assures accurate and repeatable connection between the device and the testing electronics.

According to one embodiment, each roller 30, 32 has upper and lower bearing pads 83.

In one aspect of the invention, each rail 18 is configured identically so that each one is interchangeable with any other. That is, according to one embodiment, each rail 18 is configured to hold two positioning rollers 30 on one side of the rail 18 and two pressure rollers 32 on the opposite side of the rail 18. Accordingly, as depicted in FIG. 1, when the drive to be tested is inserted into the fixture 10, it is contacted by the two positioning rollers 30 in the left rail 18 and by the one of the two pressure rollers 32 (best seen in FIGS. 3A and 3B) or both in the right rail 18. Alternatively, the fixture 10 is contacted by two positioning rollers 30 in the right rail 18 and by two pressure rollers 32 in the left rail 18. Alternatively, each rail 18 is not identical.

According to one embodiment, the rollers 30, 32 protrude somewhat from the guide surface 24 of each rail 18. The positioning rollers 30, in accordance with one aspect of the invention, protrude from about 10 mils to about 30 mils from the guide surface. In a further embodiment, the pressure rollers 32 protrude from about 50 mils to about 100 mils from the guide surface. Alternatively, the rollers 30, 32 can be spring biased.

According to one aspect of the invention, the rollers 30, 32 are mounted in a fixed manner and are slightly tilted inward in the direction of the interposer 22. That is, the top portion of each roller 30, 32 is slightly closer to the interposer 22 than the bottom portion of each roller 30, 32. According to one embodiment, the rollers 30, 32 are tilted at an angle ranging from about 1 degree to about 10 degrees. According to one embodiment, this tilt provides a downward force that urges the inserted device onto the guide plane 24 for alignment purposes. Alternatively, the rollers 30, 32 are perpendicular to the plane of the base 60.

According to one aspect of the present invention, the positioning rollers 30 are spaced apart from each other on opposite ends of the rail 18, as shown in FIG. 1. In accordance with a further embodiment, the pressure rollers 32 are spaced next to or substantially adjacent to each other near a midpoint of the rail 18, as depicted in FIG. 3. With the rollers 30, 32 positioned in this fashion, the device under test is contacted at three points by the rollers 30, 32 and thus is secured in place by a type of three-point clamp formed by the rollers 30, 32. Alternatively, the rollers 30, 32 can be positioned to create a two-point or four-point clamp. In a further alternative, the rollers 30, 32 can contact the drive at more than four points. In yet another alternative, the rollers 30, 32 are positioned in any fashion that allows the rollers 30, 32 to receive and position the device to be tested in the fixture 10.

Figure 5:
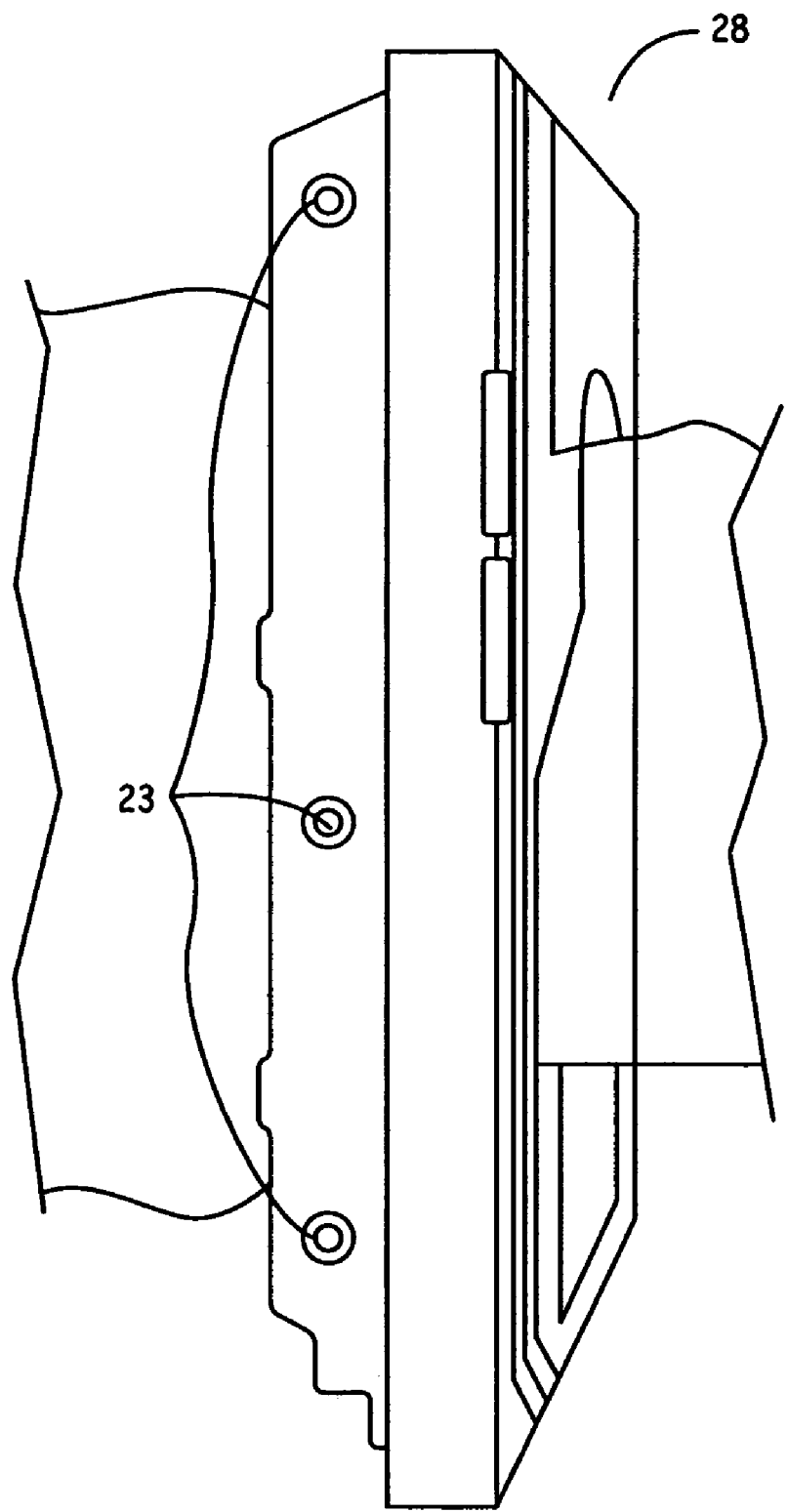
FIG. 5 is a side view of a hard disk drive to be tested in a test fixture.

Alternatively, each rail is configured to create the three-point clamping configuration with two positioning rollers 30 on one side of the rail 18 and one pressure roller 32 on the opposite side of the rail 18. This embodiment of the three-point clamping configuration functions appropriately so long as there is no need for both front and rear connection capability of the fixture 10. This is true because of the location of the mounting screw holes on an ANSI standard drive, as depicted in FIG. 5. FIG. 5 shows that the middle screw hole 23 of the standard drive 28 is not centered along the length of the side. Thus, if it is desired that the fixture 10 have the capability for positioning the drive in only one of either front or rear connection, then only one pressure roller 32 is required and need only be positioned in the rail 18 at a location that is appropriate for the connection direction. However, if it is desired that the fixture 10 have both front and rear connection capability, then two pressure rollers 32 are required. That is, two pressure rollers 32 positioned substantially adjacent to each other near the midpoint of the rail 18 provides a contact point for the drive regardless of which direction the drive is facing.

In accordance with one aspect of the invention, the positioning rollers 30 are hard and the pressure rollers 32 are soft. That is, the positioning roller 30 is fabricated of an acetal copolymer or an equivalent polymer with similar dissipative and hardness characteristics. For example, according to one embodiment, the rollers 30 are fabricated of Pomalux®, which is available from Westlake Plastics Co. of Lenni, Pa. Alternatively, the positioning roller 30 is made up of any known hard material.

Figure 4:
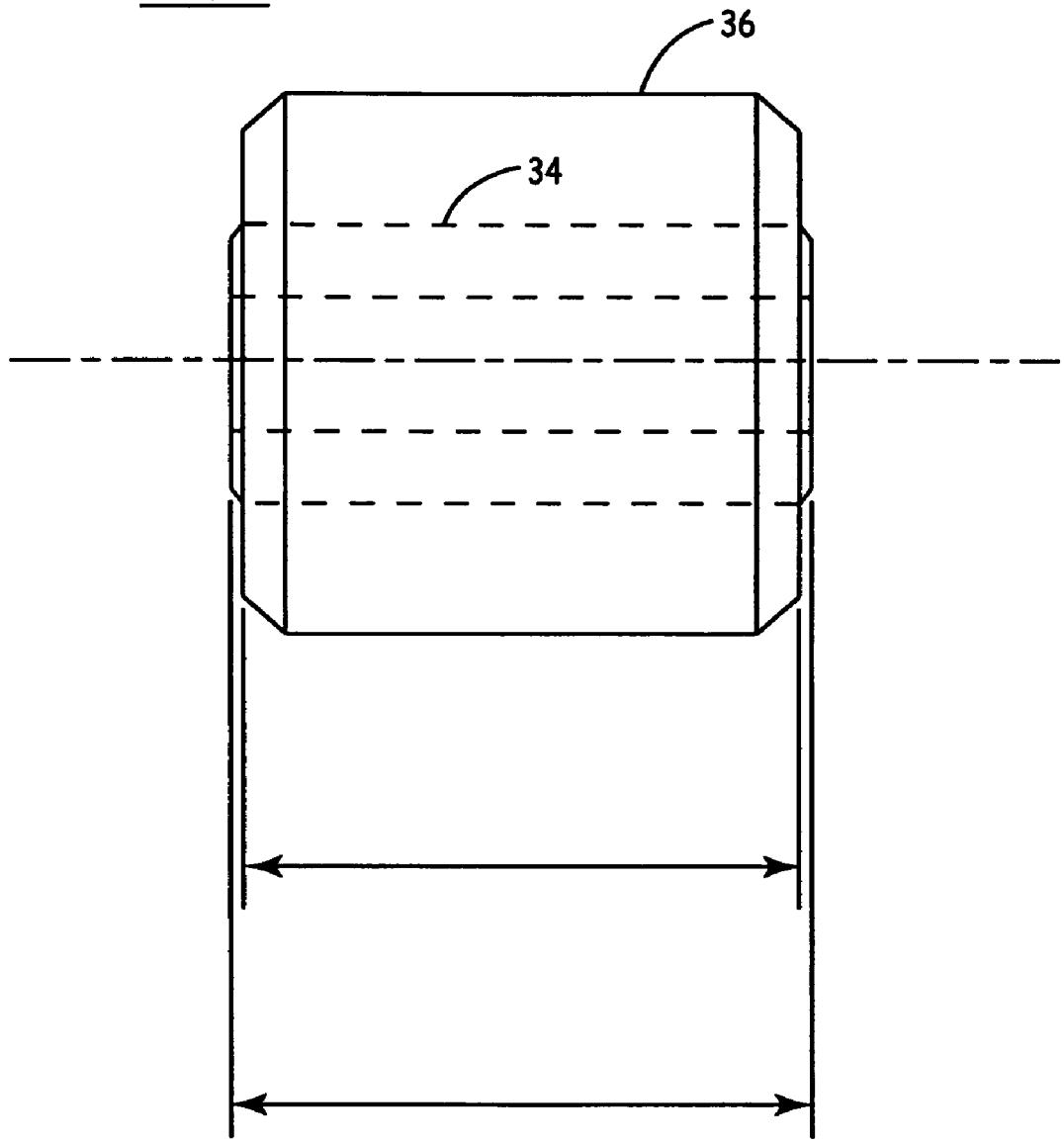
FIG. 4 is a side view of a roller, according to one embodiment of the present invention.

FIG. 4 shows an elevated view of a pressure roller 32 having an outer sleeve 36 and a core 34. The outer sleeve is made up a known soft material. According to one embodiment, the outer sleeve 36 of the pressure roller 32 is cast of a soft, rubbery elastomeric compound surrounding a central hard core 34. For example, the outer sleeve 36 can be made of K-Prene®, a urethane elastomer available from Acrotech, Inc. of Lake City, Minn. Alternatively, the outer sleeve 36 is any known soft material that can be used on the roller 32. The hard core 34 comprises a known hard material such as, for example, brass, stainless steel, or hard plastic.

The top plate, or top component, 61, in accordance with one aspect of the present invention, provides substantial rigidity and stability, which can contribute to vibration dampening in the fixture 10. According to one embodiment, the top plate 61 is configured as depicted in FIGS. 1, 2, and 3. Alternatively, the top plate 61 is configured in any structural configuration known to provide rigidity and stability, which can thereby contribute to vibration dampening.

According to one embodiment, the top plate 61 is connected to the rails 18 via spacers 80. The spacers 80 are aerodynamically shaped to provide an airflow path across the top of the drive. Alternatively, the spacers 80 have any known shape. In a further alternative, the top plate 61 is connected directly to the rails 18.

In one embodiment, the top plate 61 includes two rollers 62 that assist with insertion of the device to be tested into the fixture 10 and alignment with the interposer 22. Further, the rollers 62 can protect the device to be tested from physical marring that could occur if the device were to make inadvertent contact with the top plate 61. According to one embodiment, the rollers 62 do not touch the device to be tested after full insertion of the device. The rollers 62 are disposed on shafts 63 that are connected to the top plate 61 by rivets 64. Alternatively, the rollers 62 are connected to the top plate by any known connection means. According to one embodiment, the rollers 62 are made of an acetal polymer. For example, the rollers 62 are made of Delrin®, which is available from DuPont Co. in Wilmington, Del. Alternatively, the rollers 62 can be made of any material known to be used for rollers on a test fixture.

In accordance with one alternative embodiment, the top plate 61 has two rollers 62. Alternatively, the top plate 61 has one or more rollers 62. The rollers 62 are positioned on the top plate 61 as depicted in FIG. 1. Alternatively, the rollers 62 are positioned on the top plate 61 in any configuration that will assist with insertion and positioning of the device to be tested and that will assist with preventing damage to the device. Further, the top plate 61, in accordance with one aspect of the present invention, has tabs 73 that are configured to contact the interposer 22 and help to hold the interposer 22 in place in the slots 77.

According to one embodiment, the fixture 10 includes an ejection mechanism 37 to disconnect the device being tested from the interface with the interposer 22 and to partially expel the device from the fixture 10. The ejection mechanism 37 of the present invention overcomes the disadvantages of existing ejection mechanisms in that the present mechanism 37 is a simple, single-piece component that is inexpensive, easy to assemble and use, and is small enough to fit into a small space. As shown in FIGS. 1, 2, and 3, the ejection mechanism 37 has a handle 38 connected to two rods 39, 41 that are disposed parallel to each other and extend parallel to and below the base 60. The rods 39, 41 according to one aspect of the invention, each have back portions 40, 43 that are located adjacent to the interposer 22. The back portions 40, 43 include rubber bumpers 42 that are configured to contact the device being tested when the ejection mechanism 37 is pulled at the handle 38.

The rods 39, 41, in accordance with one aspect of the invention, are disposed within holes or slots 43 in the pan 12 near the front portion 14 of the fixture 10, and are moveable therethrough. According to one embodiment, the back portions 40, 43 are disposed within holes or slots 74 in the top plate 61 and are moveable therethrough. Back portion 40 is offset to avoid contacting any cables or wiring connecting the device under test to the interposer 22. Alternatively, back portion 43 can be offset, or in a further alternative, both back portions 40, 43 are offset, or in yet a further alternative, neither back portion 40, 43 is offset.

According to one embodiment, return springs 78 associated with the back portions 40, 43 maintain the ejection mechanism 37 in a retracted position when the handle 38 is not being pulled. Alternatively, the fixture 10 can have any known means of applying a maintaining force on the ejection mechanism 37 to hold it in the retracted position.

The rubber bumpers, according to one aspect of the invention, are made of a soft urethane that will not mar the device being tested when contact is made. Alternatively, the rubber bumpers are made of any known soft material that is capable of contacting the device without causing damage.

In accordance with an alternative embodiment, the fixture 10 has any known ejection mechanism.

The fixture 10, according to one embodiment of the present invention, has a stop device 65 configured to assist with appropriate positioning of a drive to be tested by front connection. The device 65, in one aspect of the present invention, has a handle 66 near the front portion 14 of the fixture 10. The handle 66 is connected to a rod 67 that is positioned to run parallel to the left rail 18 in a groove 69 in rail receiving plate 100 under the left rail 18. Alternatively, the rod 67 is positioned in a groove 69 under the right rail 18. Near the rear portion 16 of the fixture 10, the rod 67 is connected to a stop portion 79 that is partially disposed within a slot 72 in the top plate 61.

In its "rear connection" position, the handle 66 of the stop device 65 is positioned in a groove 75 at an end of the left rail 18 at the front portion 14 of the fixture 10. When the handle 66 is in the groove 75, the stop portion 79 is positioned in the far left portion of the slot 72 in the top plate 61. In this position, the device to be tested can be fully inserted into the fixture 10 and can interface with the interposer 22.

In its "front connection" position, the handle 66 is turned in a clockwise direction to a position that is somewhat right of the front of the left rail 18. When the handle 66 is in this position, the stop portion 79 is positioned in the far right portion of the slot 72 in the top plate 61. Further, a portion (not shown) of the stop portion 79 below the top plate 61 is positioned in the testing area of the fixture 10, thereby creating a "stop" that prevents any device that is inserted from being inserted fully to the rear portion 16 of the fixture 10 and thereby prevents the device from contacting or interfacing with the interposer 22. In this fashion, the device is positioned appropriately for front connection testing. Alternatively, any known stop mechanism may be used with a fixture 10 of the present invention.

The invention will now be described further by way of the following example.

EXAMPLE 1

Methods and Materials

Test fixtures of the present invention were tested in the following manner. Three test conditions were created.

First, 10 drives manufactured by Western Digital were tested in a test fixture of the present invention that was placed on a pallet placed on a bench ("Pallet Fixture").

Second, drives were tested in a test fixture of the present invention that was placed in an environmental testing chamber ("Chamber Fixture"). The tests were performed on 10 drives manufactured by Western Digital. The drives were distributed in a chamber that was fully populated with 90 drives. The 10 drives were distributed amongst the 90 total drives in the chamber such that the 10 drives formed a oval pattern. The remaining 80 untested drives were operating in maximum stroke maximum velocity mode, thus creating the maximum amount of vibration possible under the testing conditions.

Third, for comparison, 10 drives manufactured by Western Digital were mounted to a "golden fixture," which for this test is a large aluminum plate of approximately 25 pounds. The drives were mounted to the fixture by four boltholes 78 on the bottom of each drive as shown in FIG. 7, with the bolts penetrating the thickness of the fixture.

The following tests were performed. The drives in each of the three conditions were tested for access measure time to read ready ("Read Time"), access measure time to write ready ("Write Time"), full stroke ID to OD back to ID ("Full Stroke"), average position error signal ("Avg PES"), seek OD and settle ("OD Settle"), and seek ID settle ("ID Settle"). Each of the tests described above are internal self-tests that the drives are programmed by the manufacturer to run.

Results

Figure 6:
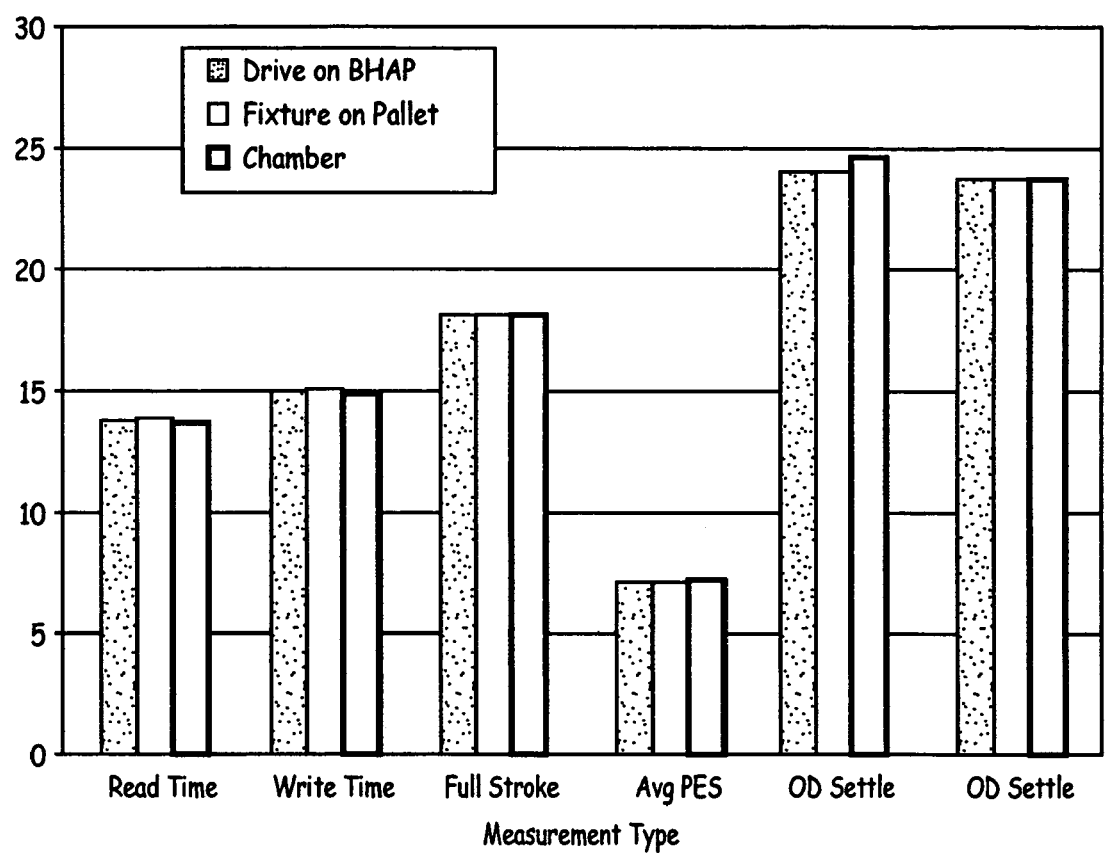
FIG. 6 is a graph setting forth test results related to Example 1.

The results are set forth in FIG. 6. In the graph, the gray-colored bars represent the data related to drives mounted on the Golden Fixture. Further, the white-colored bars represent the data related to drives mounted on the Pallet Fixture, and the black-colored bars represent the data related to drives mounted on the Chamber Fixture. The X axis shows the various tests that were performed and the Y axis represents arbitrary units for comparison purposes only.

Surprisingly, the fixture of the present invention can dampen the transmission of ambient vibrations as effectively as a Golden Fixture, as shown by the graphs. That is, regardless of whether the present fixture is tested while resting on a bench or in a test chamber, it exhibits the same damping characteristics as the Golden Fixture.

Although the present invention has been described with reference to preferred embodiments, persons skilled in the art will recognize that changes may be made in form and detail without departing from the spirit and scope of the invention.

We claim:

1. A test fixture comprising:
   (a) a base component;
   (b) a first rail and a second rail coupled to the base component;
   (c) a top component coupled to the first and second rails, the top component comprising at least one roller; and
   (d) an interposer coupled to the first and second rails.

2. The fixture of claim 1 wherein the base component, the first and second rails, and the top component are configured to achieve vibration damping similar to that achieved by a Golden Fixture.

3. The fixture of claim 1 further comprising at least one roller disposed within a recess in each of the first and second rails.

4. The fixture of claim 1 wherein the base component is coupled to a pan.

5. The fixture of claim 1 wherein the base component is configured to allow air flow around a device being tested.

6. The fixture of claim 1 wherein the first rail and the second rail are configured to allow air flow around a device being tested.

7. The fixture of claim 1 wherein the top component is configured to allow air flow around a device being tested.

8. The fixture of claim 1 wherein the base component comprises
   (a) two rail receiving plates; and
   (b) at least two braces coupled to the two rail receiving plates.

9. The fixture of claim 8 wherein the at least two braces are configured to allow air flow around a device being tested.

10. The fixture of claim 8 wherein the at least two braces comprise:
    (a) at least two main braces, each main brace having an arch structure configured to allow air flow; and
    (b) at least one secondary brace disposed between the at least two main braces, the at least one secondary brace configured to allow air flow.

11. The fixture of claim 1 wherein the interposer is configured to interface with a device to be tested.

12. A test fixture comprising:
    (a) a base component;
    (b) a first rail and a second rail coupled to the base component;
    (c) a top component coupled to the first and second rails;
    (d) an interposer coupled to the first and second rails; and
    (e) an ejection mechanism comprising two rods selectively extendable through apertures in the top component.

13. The fixture of claim 12 wherein the base component, the first and second rails, and the top component are configured to achieve vibration damping similar to that achieved by a Golden Fixture.

14. The fixture of claim 12 further comprising at least one roller disposed within a recess in each of the first and second rails.

15. The fixture of claim 12 wherein the base component is coupled to a pan.

16. The fixture of claim 12 wherein the base component, the first and second rails, and the top component are configured to allow air flow around a device being tested.

17. The fixture of claim 12 wherein the base component comprises
    (a) two rail receiving plates; and
    (b) at least two braces coupled to the two rail receiving plates.

18. The fixture of claim 17 wherein the at least two braces are configured to allow air flow around a device being tested.

19. The fixture of claim 17 wherein the at least two braces comprise:
    (a) at least two main braces, each main brace having an arch structure configured to allow air flow; and
    (b) at least one secondary brace disposed between the at least two main braces, the at least one secondary brace configured to allow air flow.

20. The fixture of claim 12 wherein the interposer is configured to interface with a device to be tested.

* * * * *